(12) United States Patent
Miura et al.

(10) Patent No.: US 8,028,593 B2
(45) Date of Patent: Oct. 4, 2011

(54) CLICK APPARATUS

(75) Inventors: Seiki Miura, Okayama (JP); Jun Sato, Okayama (JP); Takumi Nishimoto, Okayama (JP)

(73) Assignee: Panasonic Corporation, Osaka (JP)

( * ) Notice: Subject to any disclaimer, the term of this patent is extended or adjusted under 35 U.S.C. 154(b) by 264 days.

(21) Appl. No.: 12/250,093

(22) Filed: Oct. 13, 2008

(65) Prior Publication Data
US 2009/0095614 A1    Apr. 16, 2009

(30) Foreign Application Priority Data
Oct. 15, 2007   (JP) .................................. 2007-267597

(51) Int. Cl.
*F16H 35/18* (2006.01)
(52) U.S. Cl. .................................................... 74/10.41
(58) Field of Classification Search .................. 74/10 R, 74/10.1, 10.41, 527; 200/564, 565
See application file for complete search history.

(56) References Cited

U.S. PATENT DOCUMENTS

| 4,131,771 A | * | 12/1978 | Erickson et al. | 200/11 DA |
| 4,133,990 A | * | 1/1979 | Wanner et al. | 200/6 B |
| 4,272,658 A | * | 6/1981 | Crosby | 200/6 B |
| 5,589,671 A | * | 12/1996 | Hackbarth et al. | 200/6 R |
| 5,594,220 A | * | 1/1997 | Hackbarth et al. | 200/6 B |
| 5,819,597 A | * | 10/1998 | Sato et al. | 74/553 |

FOREIGN PATENT DOCUMENTS

| JP | 08-222413 | 8/1996 |
| JP | 09-063812 | 3/1997 |

\* cited by examiner

*Primary Examiner* — Vicky Johnson
(74) *Attorney, Agent, or Firm* — Pearne & Gordon LLP (57) ABSTRACT

At both of the upper and lower faces of flange section (24A) of rotation body (24) rotatably retained between lower case (21) and upper case (23) opposed to each other via inner case (22), inner concavo-convex section (25) and outer concavo-convex section (26) are provided at point-symmetric positions on concentric circles of an inner circumference-side circle and an outer circumference-side circle. Inner elastic contact projection (27C) and outer elastic contact projection (27D) of double ring-like click spring (27) respectively elastically contact inner concavo-convex section (25) and outer concavo-convex section (26) respectively corresponding to both of the upper and lower faces of flange section (24A), thereby providing a clear click feeling and a high click degree.

4 Claims, 10 Drawing Sheets

CLICK APPARATUS

BACKGROUND OF THE INVENTION

1. Field of the Invention

The present invention relates to a click apparatus that is used for a rotating operation section of an in-vehicle control apparatus such as a car air-conditioner and that generates a click feeling by a rotating operation.

2. Background Art

A rotating operation section of an in-vehicle control apparatus such as a car air-conditioner mainly uses a click-type rotating operation-type electronic component so that operability is obtained and a set position after the operation is prevented from being dislocated. Thus, the click-type rotating operation-type electronic component as described above has been required to have a high click degree in order to prevent the dislocation due to vibration or the like and to prevent a wrong operation.

A conventional click apparatus used for the click-type rotating operation-type electronic component as described above will be described with reference to FIG. 20 and FIG. 21.

Figure 20:
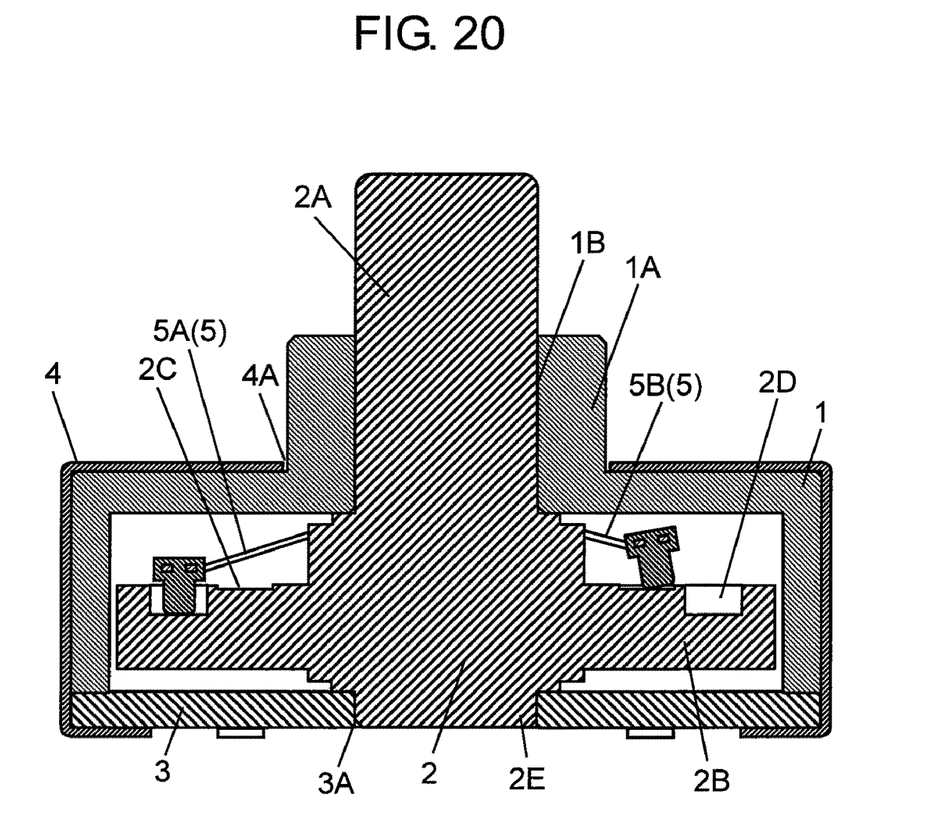
FIG. 20 is a cross-sectional view illustrating a conventional click apparatus.
Figure 21:
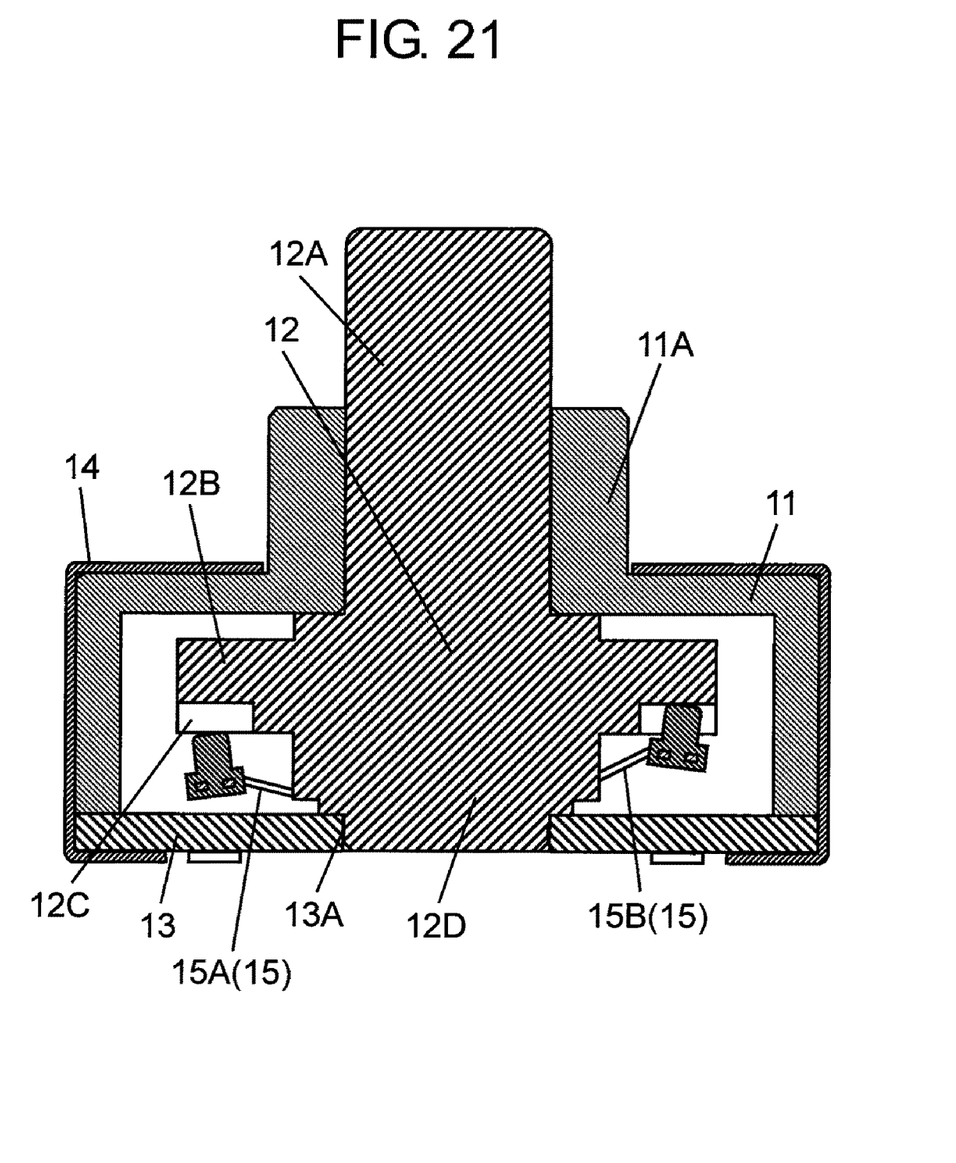
FIG. 21 is a cross-sectional view illustrating another conventional click apparatus.

FIG. 20 is a cross-sectional view illustrating a conventional click apparatus disclosed in Japanese Patent Unexamined Publication No. H9-63812. FIG. 21 is a cross-sectional view illustrating a conventional click apparatus disclosed in Japanese Patent Unexamined Publication No. H8-222413.

In the conventional click apparatus shown in FIG. 20, case 1 having an opening at the lower face has circular-cylindrical bearing section 1A that is protruded from the center in the upward direction. Bearing section 1A includes penetration hole 1B. Rotation body 2 has axis section 2A that is rotatably inserted to penetration hole 1B of bearing section 1A. Flange section 2B at the lower part of rotation body 2 is provided within the opening of the case. The upper face of flange section 2B has inner concavo-convex section 2C and outer concavo-convex section 2D that are formed on the circumference of a concentric circle. Cover plate 3 has center hole 3A. Support section 2E protruding from flange section 2B of rotation body 2 in the lower direction is rotatably fitted in center hole 3A to seal the opening at the lower face of case 1. Cover 4 is composed of a metal plate and is provided so as to upwardly protrude bearing section 1A of case 1 from middle hole 4A and to hold the side walls of case 1. The lower ends of cover 4 are caulked to be bent so as to press cover plate 3 from the lower side.

Ring-like click spring 5 is fixed at the top face of the opening of case 1. Circular arc-like parts at both ends of click spring 5 opposed to each other are bent to the lower side. Among the bent parts, the one having a longer length to the tip end is first spring section 5A and the one having a shorter length to the tip end is second spring section 5B. The tip end of first spring section 5A elastically contacts outer concavo-convex section 2D provided at flange section 2B of rotation body 2. The tip end of second spring section 5B elastically contacts inner concavo-convex section 2C.

When axis section 2A of rotation body 2 is rotated and operated in the configuration as described above, rotation body 2 is rotated while axis section 2A being supported by bearing section 1A of case 1 and support section 2E being supported by center hole 3A of cover plate 3. By this rotation of rotation body 2, first spring section 5A of click spring 5 elastically contacting the upper face of flange section 2B is slid over outer concavo-convex section 2D and second spring section 5B is slid over inner concavo-convex section 2C, thereby generating a click degree.

This click apparatus includes two spring sections of first spring section 5A and second spring section 5B. Thus, a strong click degree can be obtained by allowing outer concavo-convex section 2D of flange section 2B and the concave section and the convex section of inner concavo-convex section 2C to have an equal distance from the rotation center. On the contrary, a weak click degree and a double click number can be obtained by arranging outer concavo-convex section 2D and the concave section and the convex section of inner concavo-convex section 2C with angles from the rotation center dislocated by ½.

Next, a conventional click apparatus shown in FIG. 21 will be described. This click apparatus has a different configuration from that of the click apparatus shown in FIG. 20 in that click springs are provided at different positions from those in the case of the click apparatus shown in FIG. 20.

First, as in the click apparatus shown in FIG. 20, flange section 12B of rotation body 12 is positioned in the lower face opening section of case 11 and axis section 12A is rotatably inserted to bearing section 11A of case 11. Support section 12D at the lower part of rotation body 12 is supported by center hole 13A of cover plate 13. Cover 14 is caulked to be bent so as to hold case 11 to provide the entire combination.

However, in the case of the click apparatus shown in FIG. 21, ring-like click spring 15 is fixed to cover plate 13 and both circular arc-like ends of click spring 15 are upwardly bent, respectively. First spring section 15A and second spring section 15B of click spring 15 are formed to elastically contact concavo-convex section 12C provided in the lower face of flange section 12B of rotation body 12.

The operation of the click apparatus having the configuration shown in FIG. 21 is the same as that of the click apparatus of FIG. 20 and thus will not be described further.

As shown in FIG. 21, the click apparatus having this configuration is structured so that first spring section 15A and second spring section 15B are bent to have an equal length and are slid over the same concavo-convex sections 12C provided in the lower face of flange section 12B while elastically contacting the concavo-convex sections 12C.

Thus, an increased click number is obtained when the concave sections and the convex sections of concavo-convex section 12C in the lower face of flange section 12B are positioned so as to be opposed to one another with regards to the rotation center as shown in FIG. 21. A click apparatus having a strong click degree is also obtained when the concave sections and the convex sections have the same positional relation with regards to the rotation center.

In the case of the conventional click apparatus shown in FIG. 20, when rotation body 2 receives an elastic contact force from click spring 5 and rotates, friction is caused between the upper face surrounding center hole 3A of cover plate 3 and support section 2E. In the case of the conventional click apparatus shown in FIG. 21 on the other hand, when rotation body 12 receives an elastic contact force from click spring 15 and rotates, friction is caused between the lower face of bearing section 11A of case 11 and support section 12D.

However, when these conventional click apparatuses have increased elastic contact forces from click springs 5 and 15 in order to provide an increased click degree in accordance with a demand from a device in which the click apparatuses are used, pressures given from rotation bodies 2 and 12 to support sections 2E and 12D are also increased. This has caused a disadvantage that the above friction proportionally-increased due to the increased pressures has suppressed a clear click feeling.

SUMMARY OF THE INVENTION

The present invention solves the conventional disadvantage as described above. The present invention provides a click apparatus that secures a clear click feeling and that provides a high click degree.

The click apparatus of the present invention includes: a lower case having a middle hole; an upper case that has a penetration hole and that is opposed to the lower case; an inner case that has a hollow section and that is provided between the lower case and the upper case; a rotation body in which a flange section is positioned in the hollow section of the inner case, the flange section is structured so that an upper face includes an inner concavo-convex section and an outer concavo-convex section that have a concavo-convex relation on concentric circumferences, respectively, and a lower face includes the inner concavo-convex section and the outer concavo-convex section at positions plane-symmetrical to the upper face, respectively, a support section downwardly protruding from the center of the flange section is supported by the middle hole of the lower case, and an operation section upwardly protruding from the center of the flange section is supported by the penetration hole of the upper case and can be rotated; an upper face click spring that has an inner elastic contact projection sliding over the inner concavo-convex section of the upper face while having elastic contact thereto and an outer elastic contact projection sliding over the outer concavo-convex section of the upper face while having elastic contact thereto and that is made of elastic material provided at the lower face of the upper case; and a lower face click spring that has an inner elastic contact projection sliding over the inner concavo-convex section of the lower face while having elastic contact thereto and an outer elastic contact projection sliding over the outer concavo-convex section of the lower face while having elastic contact thereto and that is made of elastic material provided at the upper face of the lower case. When the operation section is rotated, two the inner elastic contact projections and two the outer elastic contact projections of the two click springs are slid over the inner concavo-convex section and the outer concavo-convex section of the upper face and the lower face of the flange section, respectively, while having elastic contact thereto.

According to this configuration, the pressure by the click springs is applied to the same positions of both of the upper and lower faces of the flange section of the rotation body in a balanced manner. Thus, the rotation body is prevented from being inclined. Thus, friction between the rotation body and the support section member such as the upper case and the lower case can be suppressed, thereby providing a further clearer click feeling and a high click degree.

DETAILED DESCRIPTION OF THE INVENTION

The present invention includes: a lower case having a middle hole; an upper case that has a penetration hole and that is opposed to the lower case; an inner case that has a hollow section and that is provided between the lower case and the upper case; a rotation body in which a flange section is positioned in the hollow section of the inner case, the flange section is structured so that an upper face includes an inner concavo-convex section and an outer concavo-convex section that have a concavo-convex relation on concentric circumferences, respectively, and a lower face includes the inner concavo-convex section and the outer concavo-convex section at positions plane-symmetrical to the upper face, respectively, a support section downwardly protruding from the center of the flange section is supported by the middle hole of the lower case, and an operation section upwardly protruding from the center of the flange section is supported by the penetration hole of the upper case and can be rotated; an upper face click spring that has an inner elastic contact projection sliding over the inner concavo-convex section of the upper face while having elastic contact thereto and an outer elastic contact projection sliding over the outer concavo-convex section of the upper face while having elastic contact thereto and that is made of elastic material provided at the lower face of the upper case; and a lower face click spring that has an inner elastic contact projection sliding over the inner concavo-convex section of the lower face while having elastic contact thereto and an outer elastic contact projection sliding over the outer concavo-convex section of the lower face while having elastic contact thereto and that is made of elastic material provided at the upper face of the lower case. When the operation section is rotated, two the inner elastic contact projections and two the outer elastic contact projections of the two click springs are slid over the inner concavo-convex section and the outer concavo-convex section of the upper face and the lower face of the flange section, respectively, while having elastic contact thereto.

By this configuration, the same click springs elastically contact the same positions that are symmetrical to the rotation center of the rotation body and that are symmetrical at both of the upper and lower faces of the flange section. Thus, the elastic contact forces from the click springs can be applied to the flange section in a well-balanced manner. Thus, substantially no influence is caused by the friction between the rotation body and the upper case and the lower case due to the pressure from the click springs and the rotation body can be rotated without being twisted. Thus, a clear click feeling can be generated. Furthermore, the click springs elastically contact the inner concavo-convex section and the outer concavo-convex section respectively provided in the upper face and the lower face. Thus, a high click degree can be obtained.

Also according to the present invention, the outer concavo-convex section provided in the flange section of the rotation body has a concave section provided so as to extend within a predetermined angle range, the click spring has an extension extending to an outer circumference of the outer elastic contact projection, the inner case has a receiving section abutting to the extension within a range in which the outer elastic contact projection of the click spring is positioned within the angle range and, when the extension is abutted to the receiving section to position the outer elastic contact projection within the angle range, the outer elastic contact projection is above the concave section.

By this configuration, a weak click degree can be obtained within a predetermined angle range. Thus, a significant change of the click degree that is difficultly achieved by a change of the inclination angle of the concavo-convex section can be realized easily.

Also according to the present invention, among inclined faces of neighboring convex section and concave section of a concavo-convex section provided in the flange section of the rotation body, at least one inclined face has an inclination different from those of other inclined faces.

By this configuration, the click degree can be changed at an arbitrary position so as to incorporate a specified rotation direction of the rotation body.

Hereinafter, embodiments of the present invention will be described with reference to FIG. 1 to FIG. 19.

Embodiments

Figure 1:
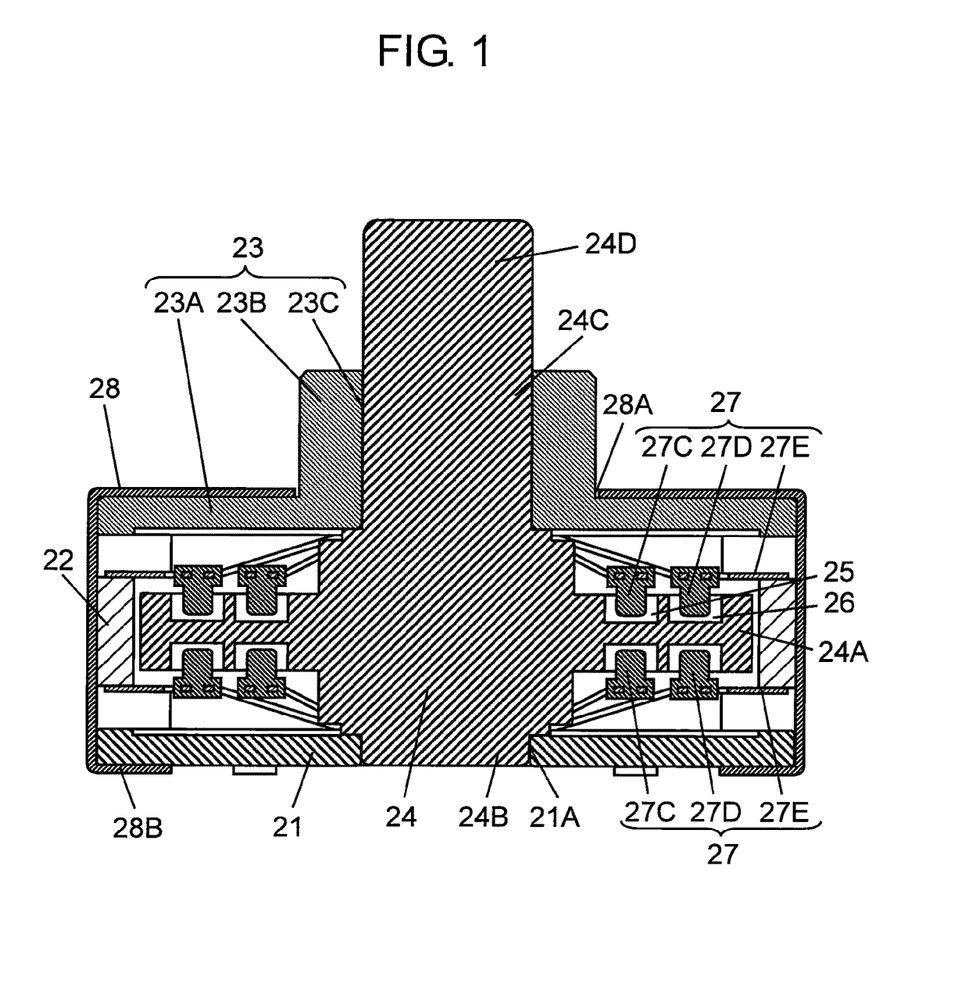
FIG. 1 is a cross-sectional view illustrating a click apparatus in one embodiment of the present invention.
Figure 2:
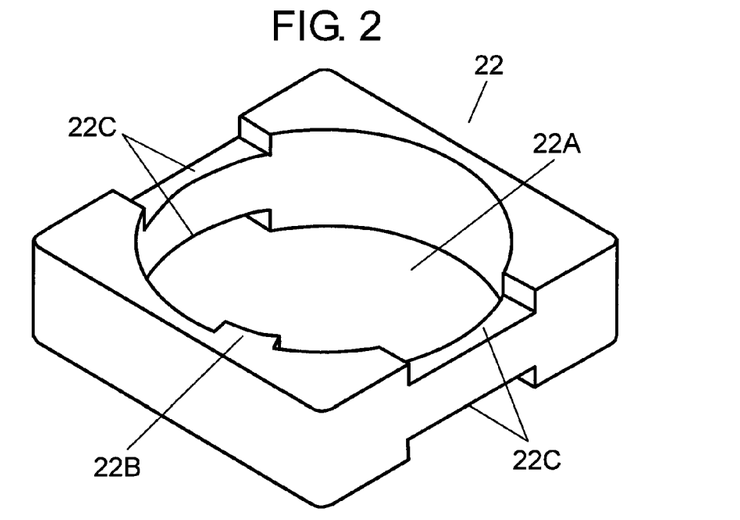
FIG. 2 illustrates an appearance of an inner case of the click apparatus.
Figure 3:
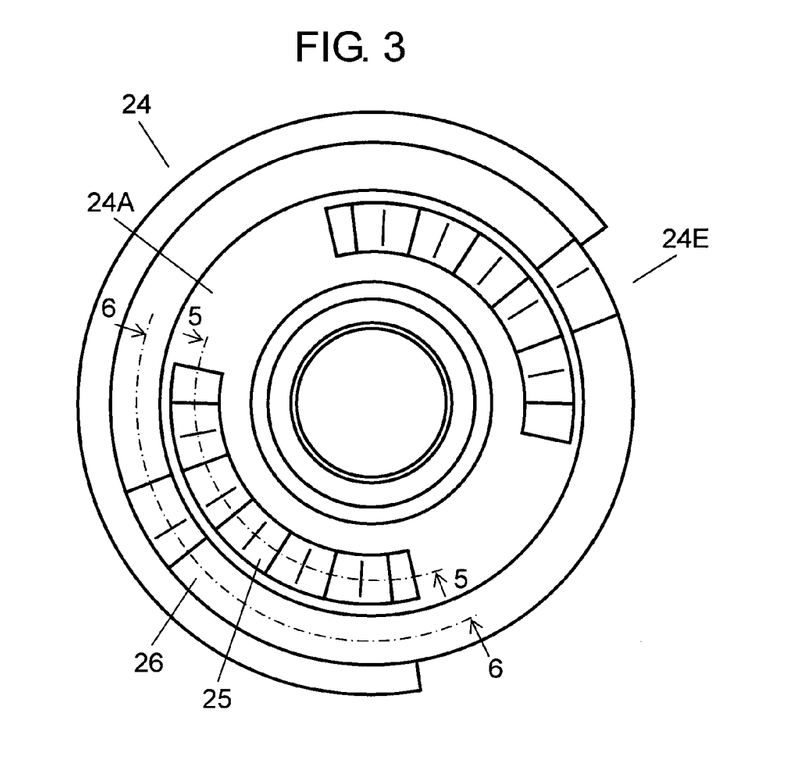
FIG. 3 is a plan view illustrating a rotation body of the click apparatus.
Figure 4:
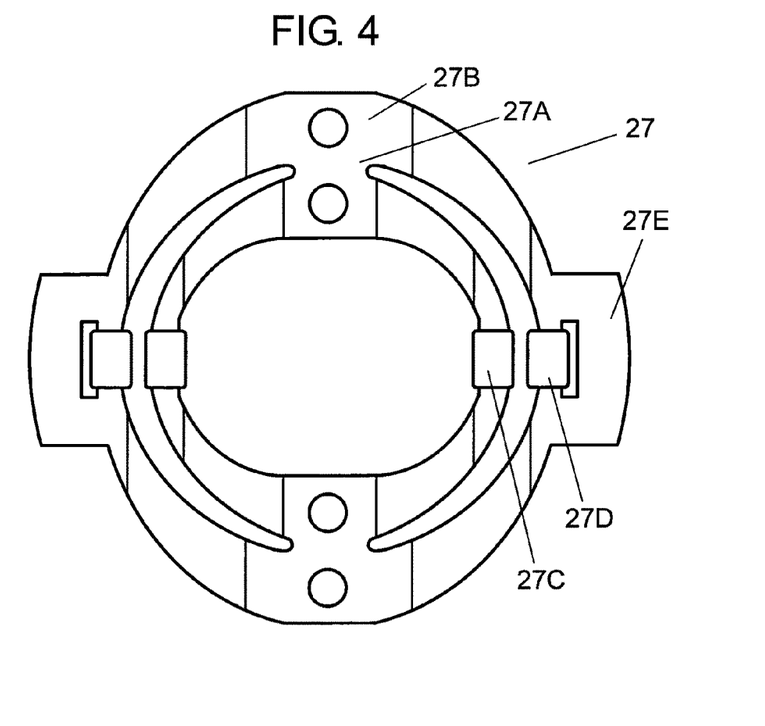
FIG. 4 is a plan view illustrating a click spring of the click apparatus.

FIG. 1 is a cross-sectional view illustrating a click apparatus according to one embodiment of the present invention. FIG. 2 illustrates an appearance of an inner case of the click apparatus. FIG. 3 is a plan view illustrating a rotation body of the click apparatus. FIG. 4 is a plan view illustrating a click spring of the click apparatus.

In FIG. 1, substantially square flat plate-like lower case 21 has circular middle hole 21A at the center thereof. Inner case 22 is formed to have a substantially square frame-like shape, is positioned above lower case 21, and has circular hollow section 22A (see FIG. 2). As shown in FIG. 2, inner case 22 includes lock section 22B that inwardly protrudes to an inner wall forming circular hollow section 22A within a predetermined angle range. At the upper and lower faces of opposed two sides of the frame, dent sections 22C are provided to have a predetermined width and the same depth, respectively.

In FIG. 1, upper case 23 is positioned so as to be opposed to lower case 21 via inner case 22. Upper case 23 has flat plate-like section 23A through the center of which circular-cylindrical bearing section 23B having circular penetration hole 23C protrudes to the upper side.

Flange section 24A of rotation body 24 is positioned within hollow section 22A of inner case 22. Support section 24B protrudes from the center of flange section 24A in the lower direction and is engaged with and supported by middle hole 21A of lower case 21 in a rotatable manner. Axis section 24C protrudes from the center of flange section 24A in the upward direction and is rotatably inserted to penetration hole 23C of bearing section 23B of upper case 23 and has a tip end that protrudes as operation section 24D from penetration hole 23C in the upward direction.

As shown in FIG. 3, an outer edge section of flange section 24A of rotation body 24 has notch 24E obtained by cutting off a predetermined angle range. By combining inner case 22 and rotation body 24 so that lock section 22B of inner case 22 is positioned at notch 24E (see FIG. 7), rotation body 24 can be rotated within a predetermined rotation angle range. In this embodiment, rotation body 24 is rotated within a rotation angle range of 100 degrees.

Flange section 24A has inner concavo-convex section 25 and outer concavo-convex section 26 on an inner circumference and an outer circumference of concentric circles, respectively. Inner concavo-convex section 25 and outer concavo-convex section 26 are provided at positions point-symmetric to the rotation center and are provided within the same angle range as the above rotation angle range. Inner concavo-convex section 25 and outer concavo-convex section 26 are provided at both of the upper and lower faces of flange section 24A. Inner concavo-convex section 25 and outer concavo-convex section 26 of the upper face and inner concavo-convex section 25 and outer concavo-convex section 26 of the lower face are positioned so as to be plane-symmetrical to a horizontal plane having the center of the thickness of flange section 24A.

Specifically, inner concavo-convex sections 25 and outer concavo-convex sections 26 provided in flange section 24A are provided in the upper face to be adjacent to each other on the inner circumference and the outer circumference within the same angle range. At the same time, inner concavo-convex sections 25 and outer concavo-convex sections 26 are provided at four point-symmetric positions (inner concavo-convex sections 25 at two positions and outer concavo-convex sections 26 at two positions), respectively. The same applies to the lower face. Specifically, inner concavo-convex sections 25 and outer concavo-convex sections 26 are provided in the lower face at an inner circumference and an outer circumference within the same angle range and are provided at four point-symmetric positions. In other words, inner concavo-convex sections 25 and outer concavo-convex sections 26 are provided at the total of eight positions and are point-symmetric with regards to the rotation center and are plane-symmetrical at the upper and lower sides of flange section 24A. Thus, inner concavo-convex section 25 and outer concavo-convex section 26 at the total of eight positions have the same concavo-convex relation, respectively.

As shown in FIG. 4, click spring 27 is composed of an elastic metal plate and has a substantially double ring-like shape when seen from the top. At two positions of click spring 27 opposed to each other by 180 degrees, flat plate-like attachment sections 27B connected by link section 27A are provided. Click springs 27 are fixed so as to be opposed to the respective opposing faces of lower case 21 and upper case 23 at attachment section 27B.

Both side sections of inner and outer ring-like parts are upwardly bent so as to sandwich attachment sections 27B, respectively. At the respective upwardly-bent tip ends, inner elastic contact projections 27C and outer elastic contact projections 27D are provided, respectively. Inner elastic contact projections 27C elastically contact inner concavo-convex sections 25 of the upper and lower faces of flange sections 24A of rotation body 24. Outer elastic contact projections 27D elastically contact outer concavo-convex section 26 of the upper and lower faces of flange section 24A.

Extensions 27E are provided so as to surround, from both ends of the outer sides of outer elastic contact projections 27D at two positions of the outer ring-like parts, the outer sides of outer elastic contact projections 27D to the outer circumference side, respectively. Extension 27E is extended in a direction of dent section 22C (receiving section) of inner case 22 and extension 27E is combined with dent section 22C. The shape of the receiving section of the present invention is not limited to the one of dent section 22C as shown in this embodiment. The receiving section also may have other shapes such as a flat shape so long as the receiving section can receive and support extension 27E.

Inner elastic contact projection 27C and outer elastic contact projection 27D may be respectively formed by machining an elastic metal plate constituting click spring 27 to have a protruded convex shape. However, inner elastic contact projection 27C and outer elastic contact projection 27D of this embodiment are respectively formed by subjecting insulating resin to an outsert molding to form click springs 27 to form an elastic contact face to have a smooth spherical surface. This can provide an improved click feeling.

Cover 28 composed of a metal plate is placed on flat plate-like section 23A of upper case 23. Bearing section 23B of upper case 23 is upwardly protruded from center hole 28A of cover 28. Leg sections 28B of cover 28 are downwardly extended from both side sections of upper case 23. Leg sections 28B have tip ends bent to the lower face of lower case 21. In this manner, cover 28 is attached so as to hold the entirety.

The following section will describe the shapes of concavo-convex sections at eight positions that are provided at the upper and lower faces of flange sections 24A of rotation body 24. However, as can be seen from the above description, inner concavo-convex sections 25 and outer concavo-convex sections 26 are formed to have an identical shape, respectively. Thus, the following section will describe, with reference to FIG. 3, FIG. 5, and FIG. 6, the shapes of inner concavo-convex section 25 and outer concavo-convex section 26 of the upper faces-side shown at the lower side of FIG. 3 as a representative of these concavo-convex sections.

Figure 5:
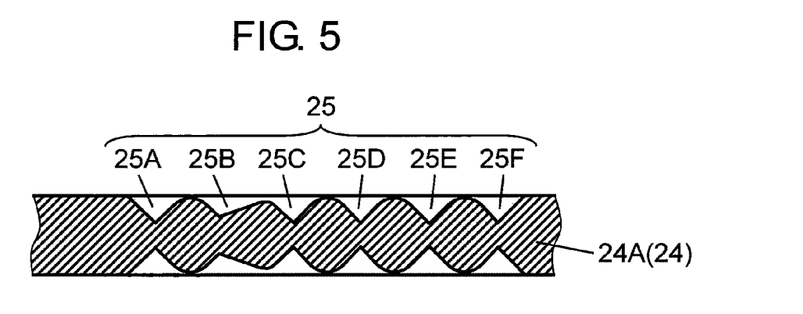
FIG. 5 is a cross-sectional view taken along the line 5-5 of FIG. 3.
Figure 6:
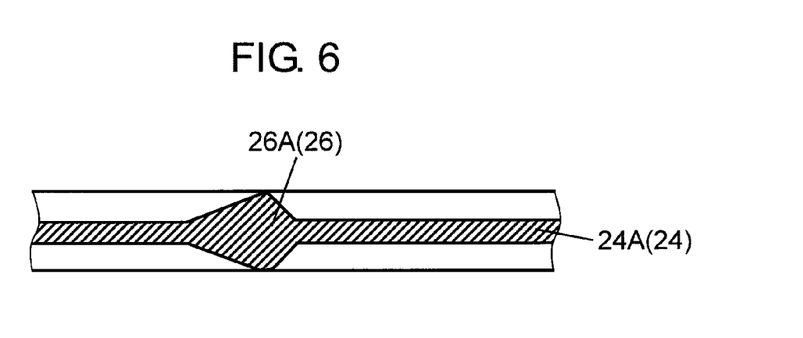
FIG. 6 is a cross-sectional view taken along the line 6-6 of FIG. 3.

FIG. 5 is a cross-sectional view of the rotation body shown in FIG. 3 taken along the line 5-5. FIG. 6 is a cross-sectional view taken along the line 6-6.

As can be seen from FIG. 3 and FIG. 5, concave sections of inner concavo-convex sections 25 are continuously provided at six positions. First concave section 25A is provided at the left end of FIG. 5. In an order from the left side to the right side, second concave section 25B, third concave section 25C, fourth concave section 25D, fifth concave section 25E, and sixth concave section 25F are provided in this order to provide a convex section between concave sections. Although this will be described later, only a convex section between second concave section 25B and third concave section 25C has an inclined face having a different inclination and the other convex sections among concave sections are formed to have the same shape.

An angle formed by the deepest section of first concave section 25A and the deepest section of sixth concave section 25F from the rotation center is 100 degrees that is the same as the rotation angle range of rotation body 24. Among the respective concave sections from first concave section 25A to sixth concave section 25F, concavo-convex sections are provided to equally have 20 degrees thereamong.

As can be seen from FIG. 3 and FIG. 6, outer concavo-convex section 26 has one outer convex section 26A that is formed within the same angle range as that of a convex section formed between the deepest section of second concave section 25B of inner concavo-convex section 25 shown in FIG. 5 and the deepest section of third concave section 25C. At both sides of outer convex section 26A, concave sections are formed that have bottom parts having a long flat surface.

An inclined face at the right side of second concave section 25B is formed to have a gentler inclined face than the inclined faces at the right sides of other concave sections. On the contrary, an inclined face at the left side of third concave section 25C is formed to have a steeper inclined face than the inclined faces at the left sides of other concave sections. Outer convex section 26A of outer concavo-convex section 26 corresponding to the convex section between second concave section 25B and third concave section 25C of inner concavo-convex section 25 is also formed to have inclination angles in accordance with the above-described gentle inclined face and steep inclined face.

As shown in FIG. 5 and FIG. 6, inner concavo-convex section 25 and outer concavo-convex section 26 at the lower face of flange section 24A of rotation body 24 are similarly provided at a horizontal plane at the center of the thickness of flange section 24A to have a plane-symmetrical positional relation.

The following section will describe the operation of the click apparatus of this embodiment having the configuration as described above. As described above, concavo-convex sections provided in flange sections 24A of rotation body 24 are provided so that inner concavo-convex sections 25 are provided at four positions and outer concavo-convex sections 26 are provided at four positions at the upper and lower sides, respectively. These concavo-convex sections elastically contact the elastic contact projections of click spring 27 that are composed of inner elastic contact projections 27C at four positions and outer elastic contact projections 27D at four positions. These elastic contact projections of click spring 27 have a point-symmetric and plane-symmetrical positional relation. Thus, the operation of the concavo-convex section of the upper face-side of flange section 24A shown in the cross-sectional positions in FIG. 5 and FIG. 6 respectively will be representatively described.

First, in an initial state shown in the cross-sectional view of FIG. 1, operation section 24D at the upper part of axis section 24C protruding from bearing section 23B of upper case 23 is rotated in a counterclockwise direction when seen from the top (hereinafter referred to as CCW rotation) and the end of notch 24E of flange section 24A of rotation body 24 is abutted to lock section 22B of inner case 22.

Figure 7:
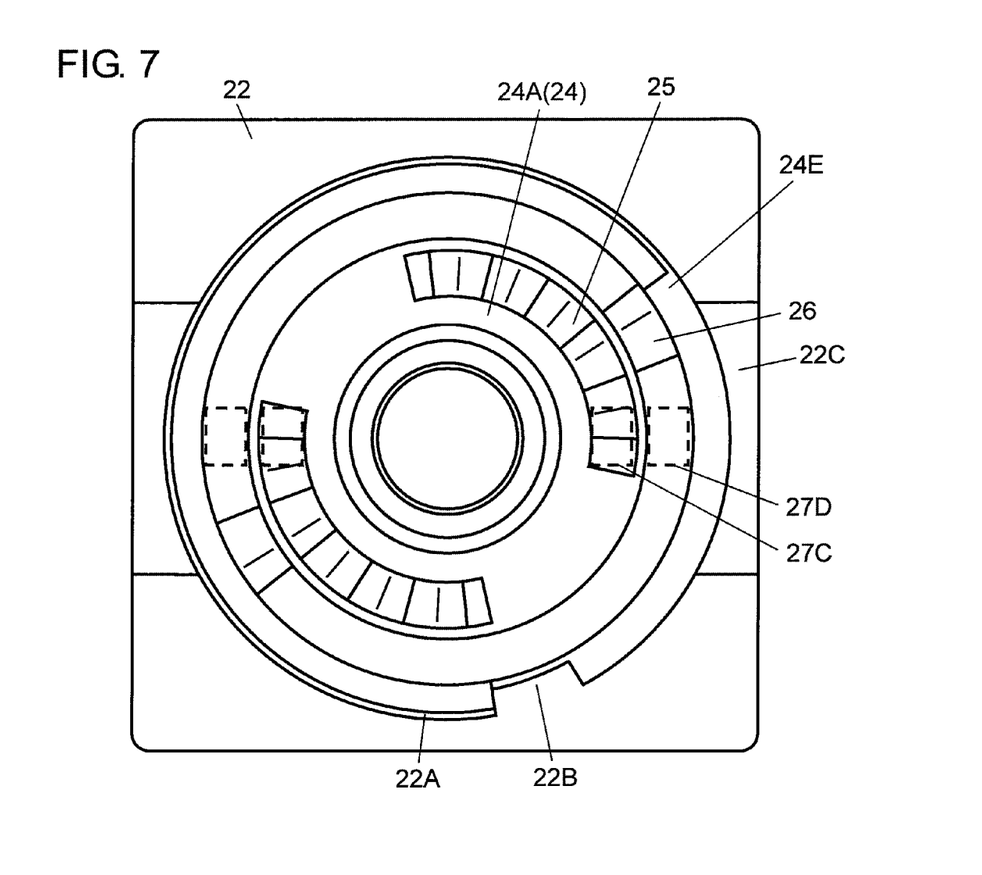
FIG. 7 is a top view illustrating the rotation body and inner case at positions at which a CCW rotation is fully completed.

FIG. 7 is a top view illustrating the relation between rotation body 24 and inner case 22 at a position at which the CCW rotation of operation section 24D is fully completed. In FIG. 7, the respective positions of inner elastic contact projection 27C and outer elastic contact projection 27D are shown by broken lines.

Figure 8:
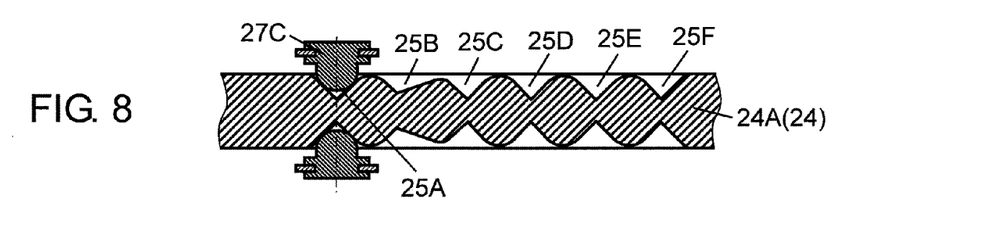
FIG. 8 is a cross-sectional view illustrating an inner concavo-convex section at the position of FIG. 7.
Figure 9:
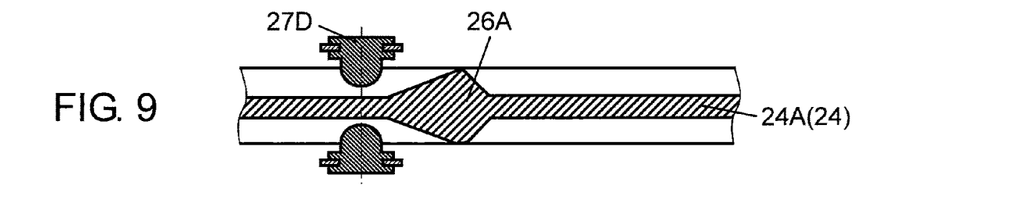
FIG. 9 is a cross-sectional view illustrating an outer concavo-convex section at the position of FIG. 7.

FIG. 8 and FIG. 9 are cross-sectional views of inner concavo-convex section 25 and outer concavo-convex section 26 corresponding to FIG. 7 as in the relation of FIG. 5 and FIG. 6 to FIG. 3, respectively.

In this state, as shown in FIG. 8, inner elastic contact projection 27C of click spring 27 is positioned at first concave section 25A of inner concavo-convex section 25 of flange section 24A of rotation body 24. On the other hand, with regards to outer elastic contact projection 27D, the left bottom part of outer convex section 26A is positioned at a long flat surface-like part of the concave section as shown in FIG. 9 and outer elastic contact projection 27D is above the bottom face of the concave section. This is because that the lower face of extension 27E provided to surround the outer circumference of outer elastic contact projection 27D of click spring 27 as shown in FIG. 1 is maintained to be abutted to the upper face of dent section 22C of inner case 22.

Next, when operation section 24D is rotated in a clockwise direction when seen from the top (hereinafter referred to as CW rotation), inner elastic contact projection 27C goes over the right inclined face of first concave section 25A and is stably positioned at the deepest section of second concave section 25B.

In order to differentiate a click degree obtained by the CW rotation of rotation body 24 from a click degree obtained by the CCW rotation of rotation body 24, the former is represented as a CW click degree and the latter is represented as a CCW click degree, respectively.

This process in which inner elastic contact projection 27C goes over second concave section 25B is felt by an operator as a click feeling. A force applied to operation section 24D to allow inner elastic contact projection 27C to go over second concave section 25B is a click torque. Therefore, among the click torques generated in this click apparatus, the sum of click torques respectively generated at inner concavo-convex sections 25 at four positions (the-four-times-higher click torque in this embodiment) is the first CW click torque.

Figure 10:
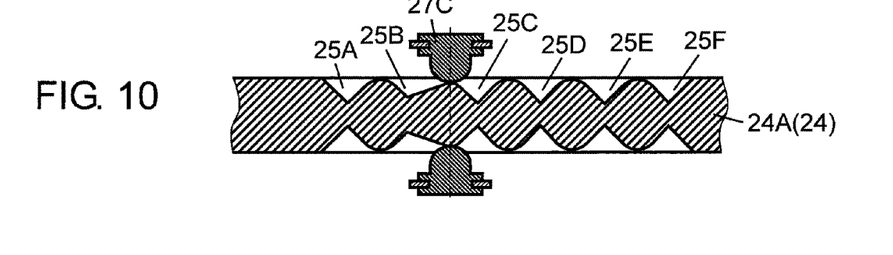
FIG. 10 is a cross-sectional view explaining the operation of an inner elastic contact projection.
Figure 11:
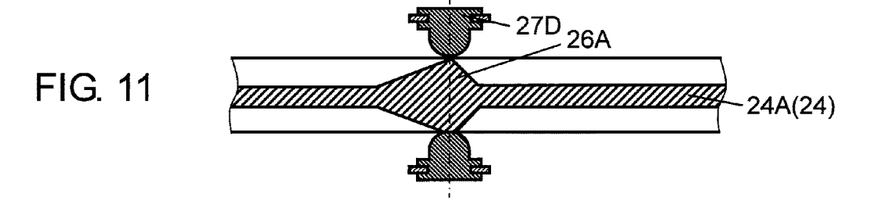
FIG. 11 is a cross-sectional view explaining the operation of an outer elastic contact projection.

When operation section 24D is further rotated from second concave section 25B to third concave section 25C, inner elastic contact projection 27C goes over the right inclined face of second concave section 25B as shown in FIG. 10a and FIG. 11 and outer elastic contact projection 27D also goes over the inclined face. When inner elastic contact projection 27C then completely moves over the inclined face to pass the top of the convex section, inner elastic contact projection 27C is rapidly moved by the spring pressure to the deepest section of third concave section 25C and outer elastic contact projection 27D is also goes down over the right inclined face. Outer elastic contact projection 27D in this state is maintained so that extension 27E provided to surround the outer circumference elastically contacts the upper face of dent section 22C of inner case 22.

When inner elastic contact projection 27C is moved from the deepest section of second concave section 25B to the deepest section of third concave section 25C to simultaneously cause outer elastic contact projection 27D to go over outer convex section 26A, the second CW click torque is generated. The second CW click torque is generated by inner elastic contact projections 27C and outer elastic contact projections 27D at the total of eight positions. Thus, the second CW click torque has a higher value than that of the first CW click torque. However, the right inclined face of second concave section 25B of inner concavo-convex section 25 and the left inclined face of outer convex section 26A of outer concavo-convex section 26 are formed to have gentle inclined faces so as to have the same click torque as the first CW click torque. The gentle inclined faces as described above cause the top of the convex section between second concave section 25B and third concave section 25C to be dislocated from the top of outer convex section 26A in the CW rotation direction (the right direction in the drawing).

When operation section 24D is further subjected to the CW rotation, inner elastic contact projection 27C is moved from the deepest section of third concave section 25C to the deepest section of fourth concave section 25D. On the other hand, outer elastic contact projection 27D is positioned at the concave section that is at the right side of outer convex section 26A and that has a long flat surface-like bottom part and outer elastic contact projection 27D is above the bottom face of the concave section. This is because that, as described above, the lower face of extension 27E provided to surround the outer circumference of outer elastic contact projection 27D of click spring 27 is maintained while elastically contacting the upper face of dent section 22C of inner case 22. In the subsequent CW rotation range, this state is maintained.

The third CW click torque in this CW rotation is the sum of four click torques by inner elastic contact projection 27C and has the same value as that of the first CW click torque.

Similarly, inner elastic contact projection 27C is moved from the deepest section of fourth concave section 25D to the deepest section of fifth concave section 25E and is moved from the deepest section of fifth concave section 25E to the deepest section of sixth concave section 25F by the same operation to move inner elastic contact projection 27C from the deepest section of third concave section 25C to the deepest section of fourth concave section 25D. Thus, the fourth CW click torque and the fifth CW click torque generated by this operation have the same value as those of the first CW click torque and the third CW click torque and thus will be described further.

Figure 12:
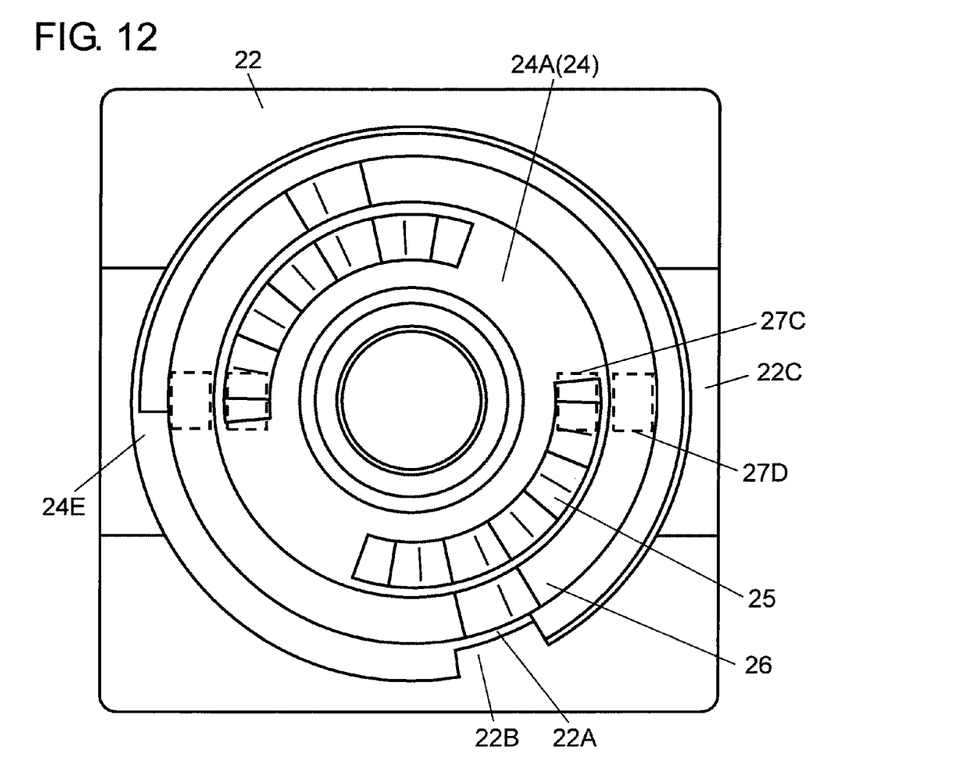
FIG. 12 is a top view illustrating the rotation body and the inner case at a position at which the CW rotation is fully completed.
Figure 13:
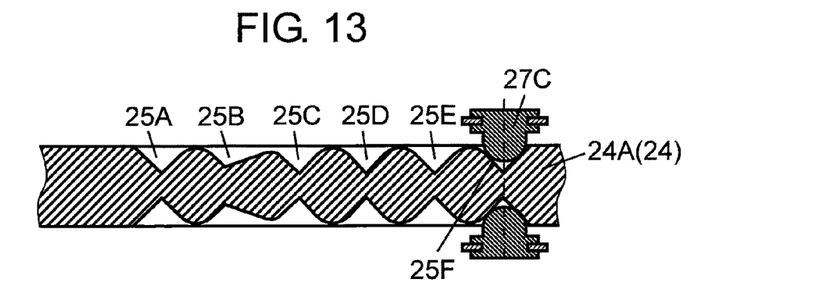
FIG. 13 is a cross-sectional view illustrating a relation between the inner concavo-convex section and the inner elastic contact projection at the position of FIG. 12.
Figure 14:
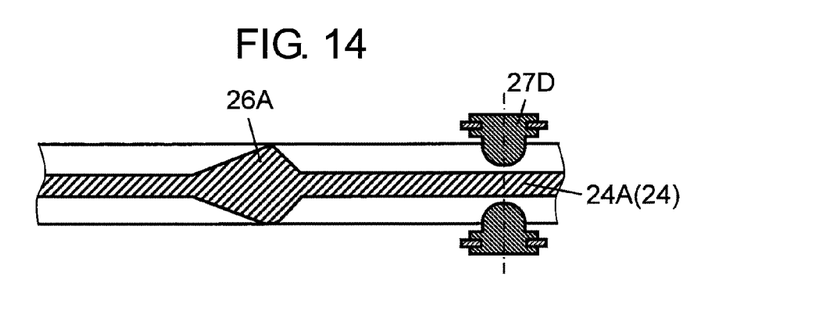
FIG. 14 is a cross-sectional view illustrating a relation between the outer concavo-convex section and the outer elastic contact projection at the position of FIG. 12.

FIG. 12 is a top view of the rotation body and the inner case illustrating a state where inner elastic contact projection 27C is positioned at the deepest section of sixth concave section 25F (i.e., a state where the CW rotation is fully completed). FIG. 13 is a cross-sectional view illustrating the relation between inner concavo-convex section 25 and inner elastic contact projection 27C in the state of FIG. 12. FIG. 14 is a cross-sectional view illustrating the relation between outer concavo-convex section 26 and outer elastic contact projection 27D in the state of FIG. 12.

In the states shown in FIG. 12 to FIG. 14 where the CW rotation is fully completed, the end of notch 24E of flange section 24A of rotation body 24 (end different from that of FIG. 7) is abutted to lock section 22B of inner case 22 and is regulated so as not to be subjected to the CW rotation any more.

Next, the following section will describe an operation for subjecting, from the states shown in FIG. 12 to FIG. 14 where the CW rotation is fully completed, operation section 24D of rotation body 24 to the CCW rotation in an opposite direction.

This operation for CCW rotation is performed in an opposite direction to that of the above-described operation. First, inner elastic contact projection 27C is moved from the deepest section of sixth concave section 25F to the deepest section of fifth concave section 25E to generate a click feeling, thereby generating the first CCW click torque. The first CCW click torque is the sum of four click torques as can be seen from the above description.

By the way, first concave section 25A, fourth concave section 25D, fifth concave section 25E, and sixth concave section 25F except for second concave section 25B and third concave section 25C have the same shape and have the same inclined face constituting convex sections thereamong. Thus, the first CCW click torque has the same value as those of the fifth CW click torque, the fourth CW click torque, the third CW click torque, and the first CW click torque.

When rotation body 24 is subjected to the CCW rotation and inner elastic contact projection 27C is moved from the deepest section of fifth concave section 25E to the deepest section of fourth concave section 25D, the second CCW click torque is generated. When inner elastic contact projection 27C is moved from the deepest section of fourth concave section 25D to the deepest section of third concave section 25C, the third CCW click torque is generated. When inner elastic contact projection 27C is moved from the deepest section of second concave section 25B to the deepest section of first concave section 25A, the fifth CCW click torque is generated. The second CCW click torque, the third CCW click torque, and the fifth CCW click torque respectively have the same conditions for an inclined face between concave sections. Thus, the same value as that of the first CCW click torque is obtained.

Figure 15:
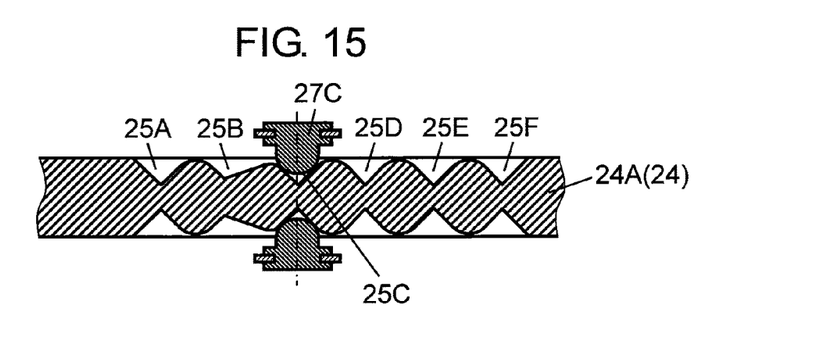
FIG. 15 is a cross-sectional view illustrating the relation between the inner concavo-convex section and the inner elastic contact projection when the inner elastic contact projection is positioned at the third concave section.
Figure 16:
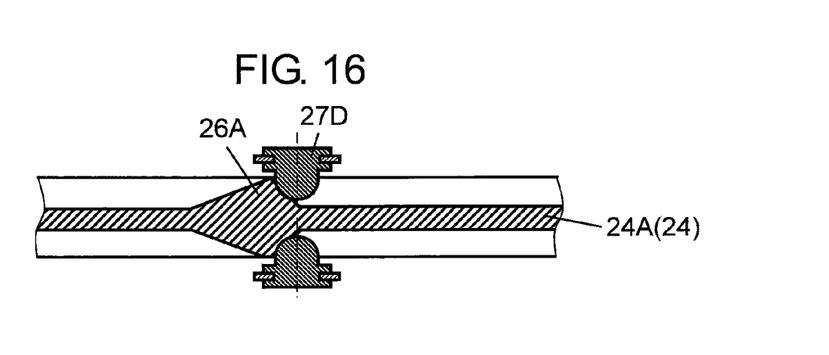
FIG. 16 is a cross-sectional view of the outer elastic contact projection illustrating the relation between the outer concavo-convex section and the outer elastic contact projection in the state of FIG. 15.

However, when inner elastic contact projection 27C is moved from the deepest section of third concave section 25C to the deepest section of second concave section 25B as shown in FIG. 15 and FIG. 16, inner elastic contact projection 27C goes over a steep inclined face. At the same time, another force is applied that is generated when outer elastic contact projection 27D goes over the right steep inclined face of outer convex section 26A. Thus, the fourth CCW click torque has a high value. In this embodiment, the inclined face is formed so as to provide a click torque that is about two times higher than other click torques.

Specifically, at positions at which click torques other than the fourth CCW click torque are generated, only inner elastic contact projection 27C goes over a convex section between concave sections. Thus, the sum of click torques by four inner elastic contact projections 27C is generated. On the other hand, the fourth CCW click torque is eight click torques by four inner elastic contact projections 27C and four outer elastic contact projections 27D.

Figure 17:
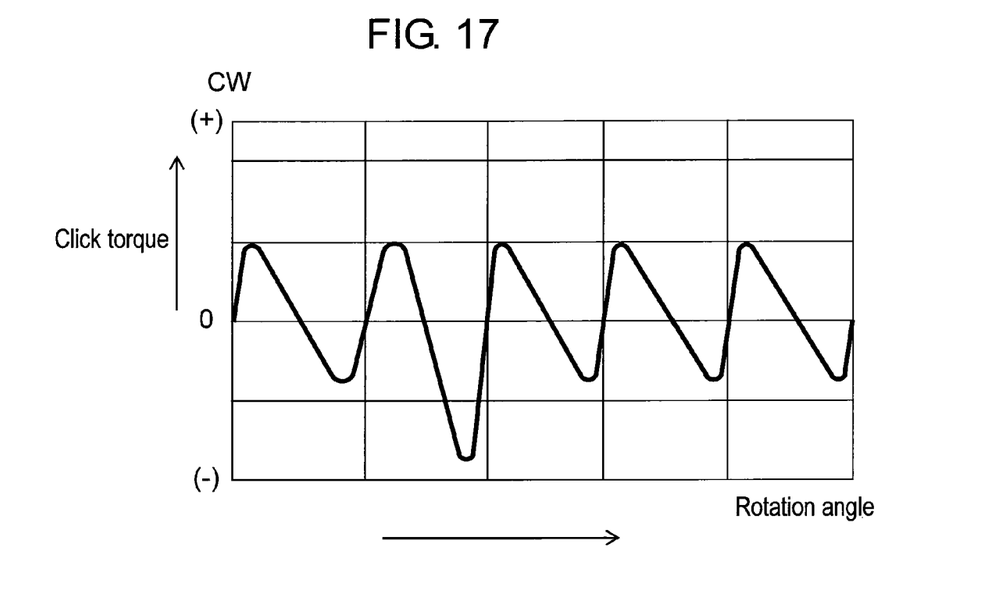
FIG. 17 is a graph illustrating a click torque in a CW rotating operation.
Figure 18:
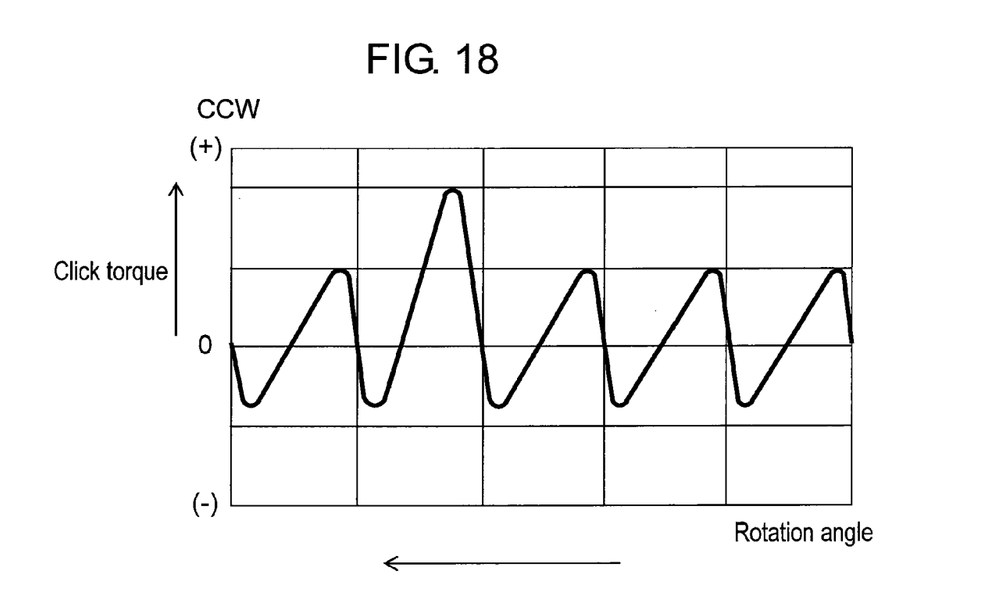
FIG. 18 is a graph illustrating a click torque in a CCW rotating operation.

FIG. 17 is a graph illustrating the relation between the respective click torques in the above-described CW rotating operation shown along the vertical axis and the rotation angle shown along the horizontal axis. FIG. 18 is also a graph illustrating the relation between the respective click torques in the CCW rotating operation and the rotation angle.

In FIG. 17 and FIG. 18, the horizontal axis drawn in the center shows a click torque value of 0. When this click torque value of 0 is obtained, inner elastic contact projection 27C is stably positioned at the deepest section of each concave section.

In FIG. 17, the click torque changes in a direction from the left side to the right side as shown by the arrow in FIG. 17. First, the first CW click torque increases by the CW rotation of rotation body 24 to cause inner elastic contact projection 27C to move upward from the deepest section of first concave section 25A of inner concavo-convex section 25 to the inclined face. When inner elastic contact projection 27C goes over the top of this inclined face, the elastic contact force by click spring 27 causes inner elastic contact projection 27C to rapidly go down over the left inclined face of the next second concave section 25B. Thus, an opposite torque shown at the negative side of FIG. 17 is instantaneously generated. Thereafter, inner elastic contact projection 27C is stably positioned at the deepest section of second concave section 25B.

When rotation body 24 is further rotated, inner elastic contact projection 27C goes up over the right inclined face of second concave section 25B and outer elastic contact projection 27D goes up over the left inclined face of outer convex section 26A. Thus, inner elastic contact projection 27C and outer elastic contact projection 27D having an influence on the click torque elastically-contact the concavo-convex face of flange section 24A at eight positions.

However, since inclined faces elastically contacting inner elastic contact projection 27C and outer elastic contact projection 27D are formed to have a gentle inclined face as described above so that the click torque is equal to other click torques, the respective click torques in the CW rotation can have the same value and click degrees at five positions are obtained. Since the left inclined face of third concave section 25C and the right inclined face of outer convex section 26A have a sharp slope, a high opposite torque shown at the negative side is also instantaneously generated just after the generation of the peak of the second CW click torque. The third CW click torque to the fifth CW click torque change in the same manner as that of the first CW click torque and show the same change in the graph.

Next, the graph of FIG. 18 will be described. In FIG. 18, the click torque changes from the right side to the left side as shown by the arrow in FIG. 18.

First, when the CW rotation is fully completed and rotation body 24 is subjected to the CCW rotation, inner elastic contact projection 27C goes over the left inclined face from the deepest section of sixth concave section 25F of inner concavo-convex section 25, thereby generating the first CCW click torque. When rotation body 24 is further rotated, the second CCW click torque and the third CCW click torque having the same magnitude are continuously obtained. The first CCW click torque to the third CCW click torque are the same as the fifth CW click torque to the third CW click torque and thus will not be described further.

When operation section 24D of rotation body 24 is subjected to the CCW rotation so that inner elastic contact projection 27C shown in FIG. 15 goes up over the left inclined face from the deepest section of third concave section 25C, the steep inclined face causes a high click torque. At the same time, outer elastic contact projection 27D shown in FIG. 16 also goes up over the right steep inclined face of outer convex section 26A and thus a high click torque is generated.

Finally, inner elastic contact projection 27C escapes from the deepest section of second concave section 25B and reaches the deepest section of first concave section 25A, thereby generating the fifth CCW click torque. This fifth CCW click torque has the same magnitude as that of the first CCW click torque for example.

As described above, this embodiment has a configuration in which inner elastic contact projections 27C and outer elastic contact projections 27D of click springs 27 having the same configuration elastically-contact to one another at plane-symmetrical positions at both of upper and lower faces of flange sections 24A of rotation body 24. Thus, even when rotation body 24 receives the elastic contact force from click springs 27, rotation body 24 is neutral and is balanced in the up-and-down direction, thus preventing a situation where rotation body 24 is rotated while being inclined. This suppresses the friction between rotation body 2 and upper case 23 or lower case 21 and provides a clear click feeling.

Furthermore, this embodiment provides the respective upper and lower faces of flange section 24A rotation body 24 with inner concavo-convex section 25 at the inner circumference and outer concavo-convex section 26 at the outer circumference side that are plane-symmetrical to each other in the upper and lower faces. In the respective faces, among the total of four inner elastic contact projections 27C and outer elastic contact projections 27D of click spring 27, two inner elastic contact projections 27C elastically contact opposed positions of inner concavo-convex section 25 opposed by 180 degrees. The remaining two outer elastic contact projections 27D elastically contact opposed positions of outer concavo-convex section 26 opposed by 180 degrees. In this manner, click torques are generated by the total of eight inner elastic contact projections 27C and outer elastic contact projections 27D in both of the upper and lower faces. Thus, a high click degree not found in the conventional design can be obtained.

In this embodiment, concave sections of four outer concavo-convex sections 26 of flange section 24A are formed as long concave sections on the circumference within a desired angle range. Within this angle range, extension 27E surrounding the outer circumference of outer elastic contact projection 27D of click spring 27 is retained while being abutted to dent section 22C of inner case 22. Specifically, this configuration prevents four outer elastic contact projections 27D from elastically contacting flange section 24A. Thus, the click degree can be reduced within this range and a significant change of the click degree that is difficultly achieved by a change of the inclination angle of the concavo-convex section can be realized easily.

In this embodiment, all of four outer elastic contact projections 27D are retained while being abutted to dent section 22C. However, any of one to four of outer elastic contact projections 27D also may be retained while being abutted to dent section 22C. This can provide a freedom degree in a change of the click degree.

Furthermore, in this embodiment, inner elastic contact projections 27C and outer elastic contact projections 27D at eight positions act on the right inclined face of second concave section 25B of inner concavo-convex section 25 and the left inclined face corresponding to the inclined face of outer convex section 26A provided in outer concavo-convex section 26 that have a gentle inclination. Furthermore, the left inclined face of third concave section 25C and the right inclined face of outer convex section 26A have a steep inclination. Thus, the same click torque value can be obtained during the CW rotation in the entire structure. However, the click torque during the CCW rotation is about two times higher than those of other positions when inner elastic contact projection 27C goes over third the left inclined face of concave section 25C and the right inclined face of outer convex section 26A.

Specifically, by providing at least one inclined face to have a different inclination from those of other inclined faces, an equal click degree can be provided at an any position in one rotation direction and a different click degree can be provided at an any position in the other rotation direction. This embodiment provides, in addition to the change of the inclination angle, a change of the number of outer elastic contact projections 27D acting on concavo-convex section. Thus, the click degree can be significantly changed depending on the rotation direction. Specifically, among inner elastic contact projections 27C and outer elastic contact projections 27D at the total of eight positions, outer elastic contact projections 27D at four positions are prevented from having elastic contact to reduce the number of elastic contacts. Thus, the click degree can be changed significantly. In this manner, the elastic contact level can be adjusted.

Figure 19:
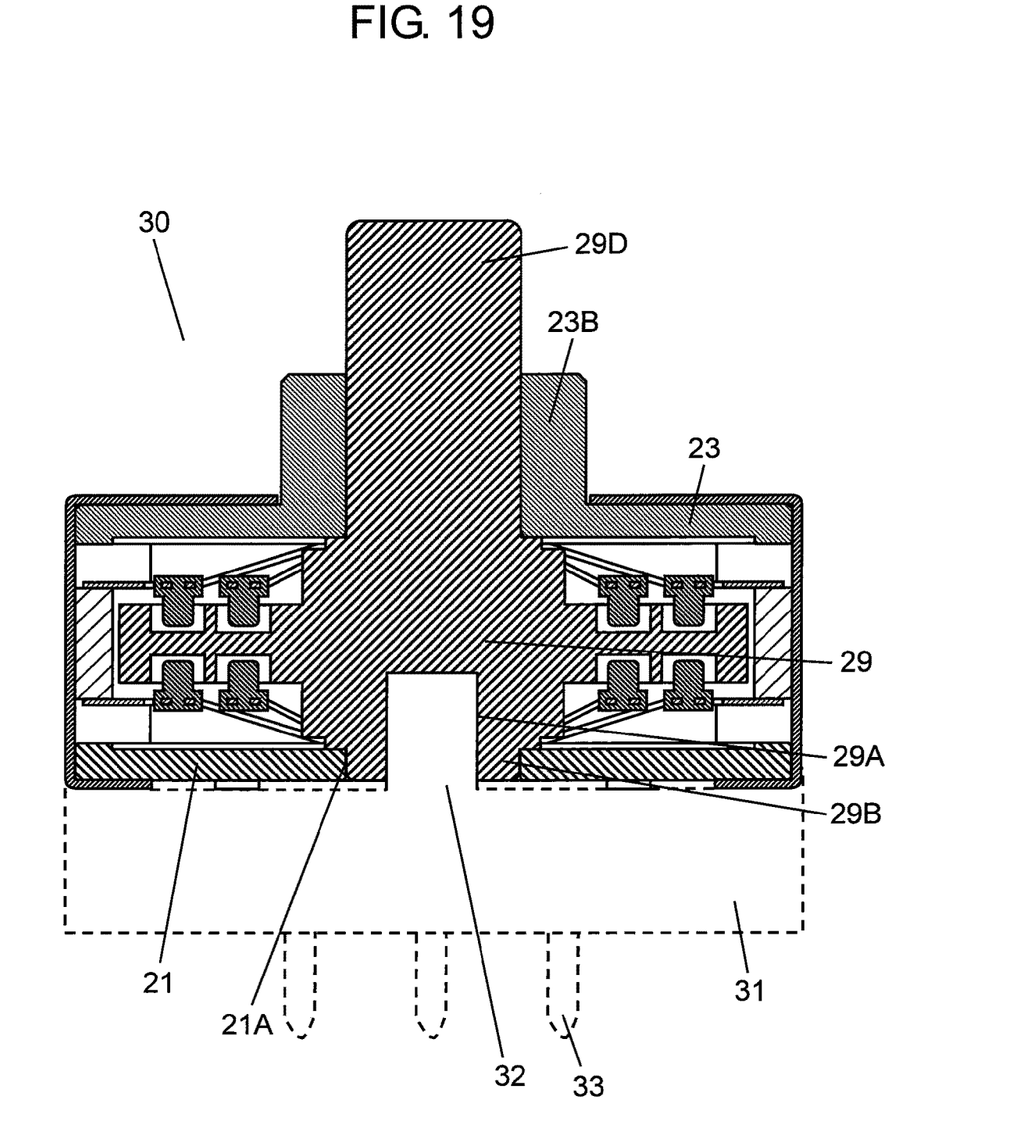
FIG. 19 is a schematic view illustrating a configuration of a rotating operation-type electronic component including a click apparatus in another embodiment of the present invention.

FIG. 19 is a schematic view illustrating the configuration of a rotating operation-type electronic component including a click apparatus according to another embodiment of the present invention. In FIG. 19, the contour of the functional section of the main body of rotating operation-type electronic component 30 is shown by the broken line. Terminal 33 for external connection is provided from housing 31 positioned at the center to the lower side. Rotation axis 32 is protruded from the center of the upper part of housing 31.

The same click apparatus as the above-described one is assumed except for that support section 29B of rotation body 29 retained by middle hole 21A of lower case 21 includes locking hole 29A. Rotation axis 32 of rotating operation-type electronic component 30 is inserted to locking hole 29A and is locked therein. When operation section 29D of rotation body 29 upwardly protruding from bearing section 23B of upper case 23 of the click apparatus is rotated and operated, the click degree as described above is obtained. At a predetermined rotation position, a predetermined electric signal is outputted from terminal 33.

By the configuration as described above, a high click degree no fount in the conventional design can be realized in the CW rotation and the CCW rotation depending on the function of an electronic device in which the click apparatus is installed and the click degree can be changed at a desired click position.

For example, the click degree can be extremely high so that the click apparatus can be stopped at a reference position within the click range even when a user unconsciously operates the click apparatus in order to set a vehicle light-related function or a temperature of an air conditioner for example. Thus, a reference position within the click range is set at a position at which the light is turned ON or OFF or at which the air conditioner is turned ON or OFF. Subsequent to the ON, the switching of high and low of the light of the switching of the blower volume of the air conditioner is set so as not to cause an excessively-high click degree, thus providing an increased freedom degree in the rotating operation.

What is claimed is:

1. A click apparatus comprising:
a lower case having a middle hole;
an upper case that has a penetration hole and that is opposed to the lower case;
an inner case that has a hollow section and that is provided between the lower case and the upper case;
a rotation body in which a flange section is positioned in the hollow section of the inner case, the flange section is structured so that an upper face includes an inner concavo-convex section and an outer concavo-convex section that have a concavo-convex relation on concentric circumferences, respectively, and a lower face includes the inner concavo-convex section and the outer concavo-convex section at positions plane-symmetrical to the upper face, respectively, a support section downwardly protruding from the center of the flange section is supported by the middle hole of the lower case, and an operation section upwardly protruding from the center of the flange section is supported by the penetration hole of the upper case and can be rotated;
an upper face click spring that has an inner elastic contact projection sliding over the inner concavo-convex section of the upper face while having elastic contact thereto and an outer elastic contact projection sliding over the outer concavo-convex section of the upper face while having elastic contact thereto and that is made of elastic material provided at the lower face of the upper case; and
a lower face click spring that has an inner elastic contact projection sliding over the inner concavo-convex section of the lower face while having elastic contact thereto and an outer elastic contact projection sliding over the outer concavo-convex section of the lower face while having elastic contact thereto and that is made of elastic material provided at the upper face of the lower case,
wherein:
when the operation section is rotated, two of the inner elastic contact projections and two of the outer elastic contact projections of the two click springs are slid over the inner concavo-convex section and the outer concavo-convex section of the upper face and the lower face of the flange section, respectively, while having elastic contact thereto.

2. The click apparatus according to claim 1, wherein:
the outer concavo-convex section provided in the flange section of the rotation body has a concave section provided so as to extend within a predetermined angle range, the click spring has an extension extending to an outer circumference of the outer elastic contact projection, the inner case has a receiving section abutting to the extension within a range in which the outer elastic contact projection of the click spring is positioned within the angle range and, when the extension is abutted to the receiving section to position the outer elastic contact projection within the angle range, the outer elastic contact projection is above the concave section.

3. The click apparatus according to claim 1, wherein:
among inclined faces of neighboring convex section and concave section of one of the inner concavo-convex section and the outer concavo-convex section provided in the flange section of the rotation body, at least one inclined face has an inclination different from those of other inclined faces.

4. The click apparatus according to claim 1, wherein the inner concavo-convex section of the upper face and lower face each include at least one concave section, further wherein each of the at least one concave section is configured to elastically contact the inner elastic contact projections of the click spring.

* * * * *